US012658779B2

(12) United States Patent
Chen et al.

(10) Patent No.: US 12,658,779 B2
(45) Date of Patent: Jun. 16, 2026

(54) POWER CONVERTER AND CONTROL CIRCUIT FOR CONTROLLING THE SAME

(71) Applicant: Chengdu Monolithic Power Systems Co., Ltd., Chengdu (CN)

(72) Inventors: Yuedong Chen, Chengdu (CN); Jiangwei Cheng, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 281 days.

(21) Appl. No.: 18/605,473

(22) Filed: Mar. 14, 2024

(65) Prior Publication Data

US 2024/0322667 A1 Sep. 26, 2024

(30) Foreign Application Priority Data

Mar. 20, 2023 (CN) .......................... 202310268082.7

(51) Int. Cl.
H02M 1/00 (2007.01)
H02M 3/335 (2006.01)

(52) U.S. Cl.
CPC ....... H02M 1/0058 (2021.05); H02M 1/0009 (2021.05); H02M 3/33571 (2021.05)

(58) Field of Classification Search
CPC .. H02M 1/0009; H02M 1/0058; H02M 1/088; H02M 1/38; H02M 3/01; H02M 3/33571
See application file for complete search history.

(56) References Cited

U.S. PATENT DOCUMENTS

| | | | | |
|---|---|---|---|---|
| 10,536,140 | B1 * | 1/2020 | Ribarich | H03K 17/0822 |
| 2005/0225257 | A1 * | 10/2005 | Green | H02M 5/458 |
| | | | | 315/307 |
| 2010/0020569 | A1 * | 1/2010 | Melanson | H01F 38/02 |
| | | | | 363/21.03 |
| 2020/0382001 | A1 * | 12/2020 | Pahkala | H02M 3/157 |
| 2020/0395863 | A1 * | 12/2020 | Song | H02M 3/33507 |
| 2023/0130783 | A1 * | 4/2023 | Bafna | H02M 1/15 |
| | | | | 323/272 |

* cited by examiner

*Primary Examiner* — Crystal L Hammond
*Assistant Examiner* — Nicolas Alden Chapa Mills
(74) *Attorney, Agent, or Firm* — Perkins Coie LLP

(57) ABSTRACT

A control circuit for a power converter. The control circuit may provide a first switch driving signal and a second switch driving signal that may be respectively used to control a first power switch and a second power switch. The control circuit may change the second switch driving signal from a second driving reset logic state to a second driving set logic state after a dead time expires since a moment when the first switch driving signal is changed from a first driving set logic state to a first driving reset logic state. The control circuit may further adaptively adjust the dead time to vary in a same direction as a capacitance parameter of the first power switch and a capacitance parameter of the second power switch vary.

20 Claims, 5 Drawing Sheets

POWER CONVERTER AND CONTROL CIRCUIT FOR CONTROLLING THE SAME

CROSS-REFERENCE

This application claims priority to, and the benefit of, Chinese application No. 202310268082.7 filed on Mar. 20, 2023, which is incorporated herein by reference in its entirety.

TECHNICAL FIELD

The embodiments of the present invention relate to integrated circuits, in particular but not exclusively to power converters and control circuits thereof.

BACKGROUND

Zero-voltage switching is often used in power converters with soft switching technology to reduce the switching loss of transistors used for on-off switching in the power converters and to optimize a dead time of the on-off switching on a cycle-by-cycle basis, which can also be referred to as adaptive dead time adjustment or ADTA for short. The timeliness and accuracy of the detection of the zero-voltage switching or the detection of the dead time is very important to realize the zero-voltage switching control. For example, in a power converter including a half bridge (i.e., including a high-side transistor and a low-side transistor electrically coupled in series), a gate driving circuit or a control circuit for driving the half bridge needs to increase the speed of the detection/adjustment of the dead time between driving the high-side transistor and driving the low-side transistor. Untimely detection/adjustment of the dead time and propagation delay of the driving circuit will cause the high-side transistor or the low-side transistor to miss the turn-on point for realizing zero-voltage switching, which will limit the working frequency (or switching frequency) of the power converter and reduce the conversion efficiency of the power converter system, especially in applications requiring higher and higher switching frequency.

SUMMARY

An embodiment of the present invention discloses a control circuit for a power converter. The control circuit is configured to provide a first switch driving signal and a second switch driving signal based on a current sensing signal and an output feedback signal, and to change the first switch driving signal from a first driving set logic state to a first driving reset logic state when the current sensing signal reaches the output feedback signal. The current sensing signal is indicative of a switch current flowing through a first power switch or a second power switch in the power converter or an inductive current flowing through an inductive energy storage device in the power converter, and the output feedback signal is indicative of an output voltage or an output power of the power converter. The control circuit is further configured to change the second switch driving signal from a second driving reset logic state to a second driving set logic state after a dead time expires since a moment when the first switch driving signal is changed from the first driving set logic state to the first driving reset logic state. The control circuit is further configured to adaptively adjust the dead time to vary in a same direction as a capacitance parameter of the first power switch and a capacitance parameter of the second power switch vary.

According to an embodiment of the present disclosure, the control circuit or the control circuit therein may be further configured to adaptively adjust the dead time to vary in an opposite direction as the output feedback signal varies.

According to an embodiment of the present disclosure, the control circuit or the control circuit therein may be further configured to adaptively adjust the dead time to vary in a same direction as an input voltage of the power converter varies.

According to an embodiment of the present disclosure, the current sensing signal may include an uncompensated current sensing signal, and the control circuit may be further configured to multiply the input voltage, an equivalent capacitance of the capacitance parameter of the first power switch and the capacitance parameter of the second power switch at a common connection terminal of the first power switch and the second power switch, and a current sensing coefficient to provide a resulting product, and then to perform division operation on the resulting product and the output feedback signal to generate the dead time. The current sensing coefficient represents a proportional coefficient of the uncompensated current sensing signal to the switch current or a proportional coefficient of the uncompensated current sensing signal to the inductive current.

According to an embodiment of the present disclosure, the control circuit further include an adaptive dead time adjustment ("ADTA") circuit, where the ADTA circuit may include a multiplier and a divider. The multiplier is configured to receive a first digital signal indicative of an input voltage of the power converter, a second digital signal indicative of an equivalent capacitance of the capacitance parameter of the first power switch and the capacitance parameter of the second power switch at a common connection terminal of the first power switch and the second power switch and a third digital signal indicative of a current sensing coefficient of the uncompensated current sensing signal to the switch current or to the inductive current, and multiply the first, second and third digital signals to provide a fourth digital signal indicative of a peak charge amount stored at the common connection terminal. The divider is configured to receive the fourth digital signal and a fifth digital signal indicative of the output feedback signal, and to perform division operation on the fourth and fifth digital signals to provide a six digital signal indicative of the dead time.

According to an embodiment of the present disclosure, the ADTA circuit may further include an analog-to-digital converter configured to receive the input voltage and to perform analog-to-digital conversion on the input voltage to provide the first digital.

According to an embodiment of the present disclosure, the analog-to-digital converter may be further configured to receive the output feedback signal and to perform analog-to-digital conversion on the output feedback signal to provide the fifth digital signal.

According to an embodiment of the present disclosure, the control circuit may further include a compensation circuit configured to receive an uncompensated current sensing signal and to superimpose the uncompensated current sensing signal with a compensation signal to generate the current sensing signal. In this example, the control circuit may be configured to multiply an input voltage of the power converter, an equivalent capacitance of the capacitance parameter of the first power switch and the capacitance parameter of the second power switch at the common connection terminal and a current sensing coefficient of the uncompensated current sensing signal to the switch current or to the inductive current to provide a resulting product, and then to perform division operation on the resulting product and a difference signal indicative of a difference between the output feedback signal and the compensation signal to generate the dead time.

According to an embodiment of the present disclosure, the ADTA circuit may include a compensation subtractor and a divider. The compensation subtractor may be configured to perform subtraction operation on the output feedback signal and the compensation signal to provide the difference signal. In this example, the divider is configured to receive the fourth digital signal and a seventh digital signal indicative of the difference signal (instead of receiving the digital signal indicative of the output feedback signal), and to perform division operation on the fourth and seventh digital signals to provide a six digital signal indicative of the dead time.

According to an embodiment of the present disclosure, the ADTA circuit may further include an analog-to-digital converter. The analog-to-digital converter may be configured to receive the difference signal (instead of receiving the output feedback signal) and to perform analog-to-digital conversion on the difference signal to provide the seventh digital signal.

According to an embodiment of the present disclosure, the dead time may be provided as the delay time signal.

According to an embodiment of the present disclosure, the control circuit may further include a logic control unit and a low-side driver. The logic control unit is configured to receive the first switch driving signal and the delay time signal and to provide a low-side control signal based at least partially on the first switch driving signal and the delay time signal. The low-side driver is configured to generate the second switch driving signal based on the low-side control signal.

According to an embodiment of the present disclosure, the ADTA circuit may include a delay subtractor configured to perform subtraction operation on a digital signal indicative of the dead time and a digital signal indicative of a propagation delay of the low-side driver to provide a subtraction result signal. In this example, the subtraction result signal (instead of the dead time) may be provided as the delay time signal and sent to the logic control unit.

According to an embodiment of the present disclosure, the logic control unit is configured to, in response to a transition edge of each transition for the first switch driving signal from a first driving set logic state to a first driving reset logic state, trigger the low-side control signal to correspondingly transit from a low-side control reset logic state to a low-side control set logic state after a delay time indicated by the delay time signal.

An embodiment of the present disclosure further proposes a power converter including the control circuit described above according to any one of the embodiments of the present disclosure.

The control circuit according to an embodiment of the present disclosure can adaptively adjust the dead time based on at least partially on the capacitance parameter of the first power switch and the capacitance parameter of the second power switch quickly and accurately. That is, the interval between the time when the first switch driving signal transits from a first driving set logic state (e.g., logic high) to a first driving reset logic state (e.g., logic low) and the time when the second switch driving signal transits from a second driving reset logic state (e.g., logic low) to a second driving set logic state can be controlled more quickly and accurately. The dead time ends just when the voltage at the common connection terminal oscillates and drops to the reference ground potential. At this time, the second switch driving signal transiting to the set logic state can immediately turn on the second power switch, thus realizing accurate zero-voltage switching, reducing the switching loss and optimizing the efficiency of the power converter.

The control circuit according to an embodiment of the present disclosure can also flexibly and adaptively adjust the dead time according to the changes of the output voltage or output power of different specific application scenarios. The control circuit according to an embodiment of the present disclosure can also flexibly and adaptively adjust the dead time according to the changes of the input voltage of different specific application scenarios.

The control circuit according to an embodiment of the present disclosure can adaptively adjust the dead time in a closed-loop manner, and the dead time can be adjusted faster and more accurately, so that the value of the dead time can be set to be smaller (for example, less than 150 ns), and the control circuit can support a higher working frequency (for example, higher than 500 kHz) while realizing more accurate zero-voltage switching control, reducing the switching loss and optimizing the efficiency of the power converter.

The control circuit according to an embodiment of the present disclosure may be further configured to eliminate or correct the influence of the propagation delay of the low-side driver on the dead time. In this way, the dead time can be made more accurate through adaptive closed-loop adjustment, and the dead time can be set without considering the time occupied by the propagation delay of the low-side driver, thus allowing the dead time to be set to be smaller (for example, less than 70 ns). In an exemplary embodiment, the dead time may be set to less than or equal to 50 ns.

BRIEF DESCRIPTION OF DRAWINGS

The following drawings are provided to better understand the following description of embodiments of the present invention. For simplicity, like reference numerals are used for like components or structures in different drawings.

DETAILED DESCRIPTION

In the following detailed description of the present invention, in order to better understand the embodiments of the present invention, a large number of specific details of circuits, components, methods, etc. are described. The present invention can be practiced even without some of these details. In order to clearly explain the present invention, some details well known to those skilled in the art are not addressed herein.

Figure 1:
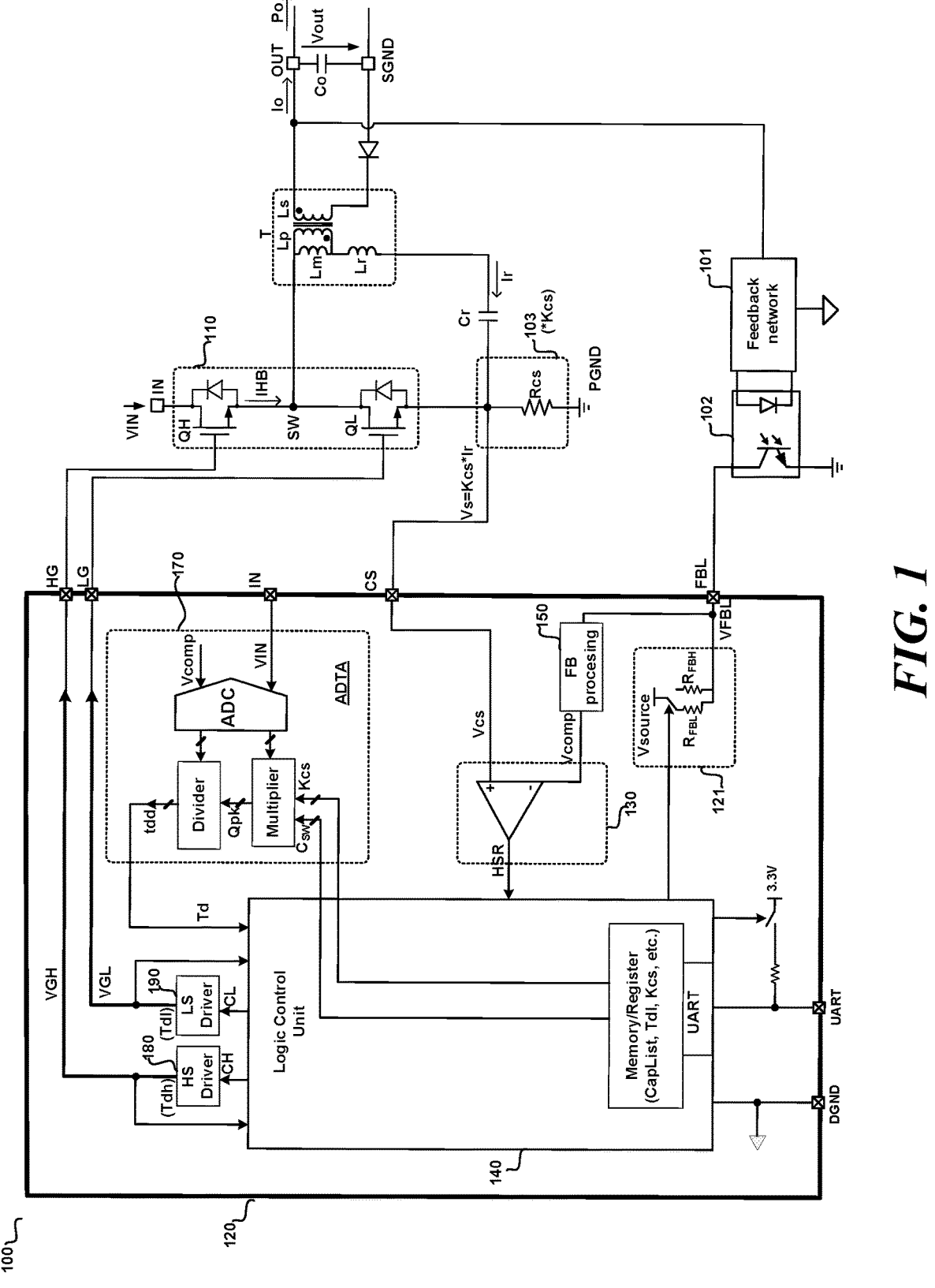
FIG. 1 schematically shows a circuit diagram of a power converter 100, in accordance with an embodiment of the present disclosure.

FIG. 1 schematically shows a circuit diagram of a power converter 100, in accordance with an embodiment of the present disclosure. The power converter 100 may include a half-bridge switching circuit 110, which may include a high-side switch (e.g., also be referred to as a first power switch) QH and a low-side switch (e.g., also be referred to as a second power switch) QL. The high-side switch QH may have a first terminal, a second terminal and a control terminal, where the first terminal of the high-side switch QH may be coupled to an input terminal IN of the power converter 100. The input terminal IN may be used to receive an input voltage VIN. The low-side switch QL may also include a first terminal, a second terminal and a control terminal, where the first terminal of the low-side switch QL may be coupled to the second terminal of the high-side switch QH to form a common connection terminal SW, and the second terminal of the low-side switch QL may be coupled to the reference ground of the power converter 100. In an example, the high-side switch QH and the low-side switch QL may each include a controllable transistor, for example, a metal oxide semiconductor field effect transistor (MOSFET) as schematically illustrated in FIG. 1.

According to an exemplary embodiment of the present disclosure, the power converter 100 may further include a control circuit 120 for controlling the half-bridge switching circuit 110. For example, the control circuit 120 may be configured to provide a high-side switch driving signal (e.g., also be referred to as a first switch driving signal) VGH and a low-side switch driving signal (e.g., also be referred to as a second switch driving signal) VGL to output terminals HG and LG of the control circuit 120, respectively. The high-side switch driving signal VGH may be used to control the on-off switching of the high-side switch QH. The high-side switch driving signal VGH may have a reset logic state (e.g., logic low) for driving the high-side switch QH to be turned off and a set logic state (e.g., logic high) for driving the high-side switch QH to be turned on. The low-side switch driving signal VGL may be used to control the on-off switching of the low-side switch QL. The low-side switch driving signal VGL may also have a reset logic state (e.g., logic low) for driving the low-side switch QL to be turned off and a set logic state (e.g., logic high) for driving the low-side switch QL to be turned on. The control circuit 120 may have a digital reference ground terminal DGND, and the control circuit 120 and its sub-circuits and the signals generated after power-on of the control circuit 120 take the potential at the digital reference ground terminal DGND as a reference ground potential.

According to an exemplary embodiment of the present disclosure, the power converter 100 may further include an inductive energy storage device T, which is shown as a transformer T having a primary winding Lp and a secondary winding Ls in FIG. 1. The primary winding Lp may be coupled between the common connection terminal SW of the high-side switch QH and the low-side switch QL and a primary-side reference ground PGND of the power converter 100. In an exemplary embodiment, the path from the common connection terminal SW through the primary winding Lp to the primary-side reference ground PGND may further include a resonant tank. For example, the resonant tank shown in FIG. 1 may include a resonant capacitor Cr and a resonant inductor Lr coupled in series. In an example, the resonant inductor Lr may include a leakage inductance of the primary winding Lp. The primary winding Lp also has an excitation inductor Lm. In an embodiment where the resonant inductor Lr is implemented with the leakage inductance of the primary winding Lp, it is unnecessary to separately illustrate the resonant inductor Lr, and for this situation, it can be considered that the resonant capacitor Cr is coupled in series on the path from the common connection terminal SW through the primary winding Lp to the primary-side reference ground PGND. In another example, the resonant inductor Lr may further include other inductive elements (such as a series inductor) connected in series with the leakage inductance of the primary winding Lp. The secondary winding Ls may be coupled between an output terminal OUT of the power converter 100 and a secondary-side reference ground SGND. In an exemplary embodiment, the path from the output terminal OUT through the secondary winding Ls to the secondary-side reference ground SGND may further include a rectifying device (e.g., including a diode or a MOSFET, which is illustrated as a diode in FIG. 1). An output capacitive energy storage device Co may be coupled between the output terminal OUT of the power converter 100 and the secondary-side reference ground SGND. Thus, in the exemplary embodiment of FIG. 1, the power converter 100 has a flyback converter topology. The present invention is not so limited. In other embodiments, the power converter 100 may have other converter topologies, such as LLC converter topologies or other converters adopting the zero-voltage switching (ZVS) control technology.

According to an exemplary embodiment of the present disclosure, the control circuit 120 may be further configured to control the logic state of the high-side switch driving signal VGH based on a current sensing signal Vcs and an output feedback signal Vcomp. In an example, the current sensing signal Vcs may be indicative of a switch current (for example, indicated by IHB in FIG. 1) flowing through the high-side switch QH or the low-side switch QL. In an example, the current sensing signal Vcs may be indicative of an inductive current flowing through the inductive energy storage device T, such as a current Ir flowing through the primary winding Lp in FIG. 1. In an example, the output feedback signal Vcomp may be indicative of an output voltage Vout or an output power Pout of the power converter 100. The output power Pout is usually determined by a product of the output voltage Vout and an output current/load current Io of the power converter 100.

In an exemplary embodiment, the control circuit 120 may be further configured to change the high-side switch driving signal VGH from the set logic state (e.g., logic high) to the reset logic state (e.g., logic low) when the current sensing signal Vcs reaches the output feedback signal Vcomp, to control the high-side switch QH to be turned off.

According to an exemplary embodiment of the present disclosure, the control circuit 120 may include a high-side switch reset control circuit 130 for receiving the current sensing signal Vcs and the output feedback signal Vcomp, and comparing the current sensing signal Vcs with the output feedback signal Vcomp to generate a high-side reset control signal HSR. The high-side switch reset control circuit 130 may be configured to, for example, trigger the high-side switch driving signal VGH to change from the set logic state (e.g., logic high) to the reset logic state (e.g., logic low) based on the high-side reset control signal HSR, when the current sensing signal Vcs reaches the output feedback signal Vcomp. In the example of FIG. 1, the high-side switch reset control circuit 130 is illustrated as including a comparator having a noninverting input (denoted by "+" in FIG. 1) and an inverting input (denoted by "−" in FIG. 1) respectively configured to receive the current sensing signal Vcs and the output feedback signal Vcomp. An output of the comparator is used to provide the high-side reset control signal HSR. The high-side switch reset control circuit 130 shown as including a comparator in FIG. 1 is only provided as an example, and the present invention is not so limited. In other embodiments, the high-side switch reset control circuit 130 may include any device capable of comparing the current sensing signal Vcs with the output feedback signal Vcomp.

According to an exemplary embodiment of the present disclosure, the control circuit 120 may further include a logic control unit 140. The logic control unit 140 may be configured to receive the high-side reset control signal HSR and provide a high-side control signal CH to a high-side driver (HS Driver)180 based at least partially on the high-side reset control signal HSR. The high-side driver 180 may be configured to generate the high-side switch driving signal VGH based on the high-side control signal CH. Ideally, the high-side driver 180 may be configured to enhance the driving ability of the high-side control signal CH (i.e., to increase a difference between the amplitudes of the logic high and the logic low of the high-side control signal CH), and the output high-side switch driving signal VGH is synchronized/consistent with the logic state of the high-side control signal CH. However, in practical circuits and applications, the high-side driver 180 has a high-side driver propagation delay Tdh. That is, a transition moment of each logic state transition (e.g., from high level to low level or from low level to high level) of the high-side control signal CH, after enhanced by the high-side driver 180, is only transformed into/reflected as a corresponding logic state transition moment of the high-side switch driving signal VGH after the high-side driver propagation delay Tdh.

According to an exemplary embodiment of the present disclosure, the control circuit 120 may further include a feedback processing circuit 150 for receiving a signal VFBL indicative of the output voltage Vout, and processing the signal VFBL to generate the output feedback signal Vcomp. Usually for specific application scenarios, when the application parameters have been determined, the output feedback signal Vcomp can be regarded as a determined parameter. In FIG. 1, it is shown that the output voltage Vout is sensed by an active circuit 121, a feedback network 101 and an optical coupler 102 to generate the signal VFBL. The active circuit 121 may be integrated in the control circuit 120, which selectively supplies power to the resistive elements RFBL and RFBH coupled between a set voltage Vsource and a feedback terminal FBL of the control circuit 120 through the set voltage Vsource. The feedback network 101 and the optical coupler 102 maybe outside of the control circuit 120. The feedback network 101 may be coupled to the output terminal OUT, and may further be coupled to the feedback terminal FBL of the control circuit 120 via the optical coupler 102. In this example, the output feedback signal Vcomp varies in an opposite direction as the output voltage Vout varies, that is, the output feedback signal Vcomp decreases as the output voltage Vout increases, and increases as the output voltage Vout decreases. The output feedback signal Vcomp varies in a same direction as the output power Pout varies, that is, the output feedback signal Vcomp increases as the output power Pout increases, and decreases as the output power Pout decrease.

According to an exemplary embodiment of the present disclosure, the power converter 100 may further include a current sensing circuit 103 for sensing the switch current (for example, indicated by IHB in FIG. 1) flowing through the high-side switch QH or the low-side switch QL, or sensing the inductive current flowing through the inductive energy storage device T, to provide an uncompensated current sensing signal Vs. The current sensing circuit 103 may have a current sensing coefficient (or a current sensing gain) Kcs. In such an example, the current sensing coefficient Kcs can be regarded as a proportional coefficient of the uncompensated current sensing signal Vs to the switch current, or a proportional coefficient of the uncompensated current sensing signal Vs to the inductive current. For example, in FIG. 1, it is shown that the current sensing circuit 103 is configured to sense the current Ir of the primary winding Lp of the inductive energy storage device T to provide the uncompensated current sensing signal Vs, then $Vs=Kcs*Ir$. In FIG. 1, the uncompensated current sensing signal Vs may be received through, for example, a current sensing terminal CS of the control circuit 120, and provided as the current sensing signal Vcs to the high-side switch reset control circuit 130. In FIG. 1, the current sensing circuit 103 is exemplarily illustrated as including a current sensing resistor Rcs (for simplicity, its resistance value is also indicated by an Rcs), coupled between the half-bridge switching circuit 110 and the primary-side reference ground PGND, and in this example $Kcs=Rcs$. The present invention is not so limited. In other embodiments, the current sensing circuit 103 may include any other circuit or element that can realize the current sensing function. For example, in another example, the current sensing circuit 103 may include a network including a resistor and a capacitor, and in another example, the current sensing circuit 103 may include a current sensing amplifier, all of which are well known to those skilled in the art and will not be described in detail in the present disclosure.

Continuing to refer to FIG. 1, in an exemplary embodiment, the control circuit 120 may be further configured to change the low-side switch driving signal VGL from the reset logic state (e.g., logic low) to the set logic state (e.g., logic high) to control the low-side switch QL to be turned on, after a dead time tdd expires since a moment when the high-side switch driving signal VGH is changed from the set logic state (e.g., logic high) to the reset logic state (e.g., logic low). In this way, the dead time tdd can be set between the turn-off time of the high-side switch QH and the turn-on time of the low-side switch QL, and both the high-side switch QH and the low-side switch QL are turned off during the dead time tdd.

According to an exemplary embodiment of the present disclosure, the logic control unit 140 may be further configured to control the logic state of the low-side switch driving signal VGL based on the high-side switch driving signal VGH and the dead time tdd. For example, the logic control unit 140 may change the low-side switch driving signal VGL from the reset logic state (e.g., logic low) to the set logic state (e.g., logic high) after the dead time tdd expires since a moment when the high-side switch driving signal VGH is changed from the set logic state (e.g., logic high) to the reset logic state (e.g., logic low). In an exemplary embodiment, the logic control unit 140 may be further configured to receive the high-side switch driving signal VGH and a delay time signal Td carrying information about the dead time tdd, and provide a low-side control signal CL to a low-side driver (LS Driver) 190 based at least partially on the high-side switch driving signal VGH and the delay time signal Td. The low-side driver 190 generates the low-side switch driving signal VGL based on the low-side control signal CL. Ideally, the low-side driver 190 is used to enhance the driving ability of the low-side control signal CL (i.e., to increase the difference between the amplitudes of the logic high and the logic low of the low-side control signal CL), and the output low-side switch driving signal VGL is synchronized/consistent with the logic state of the low-side control signal CL. However, in practical circuits and applications, the low-side driver 190 has a low-side driver propagation delay Tdl (that is, the delay time when the low-side driver 190 performs signal processing or signal transmitting). That is, a transition moment of each logic state transition (e.g., from high level to low level or from low level to high level) of the low-side control signal CL, after enhanced by the low-side driver 190, is only transformed into/reflected as a corresponding logic state transition moment of the low-side switch driving signal VGL after the low-side driver propagation delay Tdl. The corresponding logic state transition here can refer to the low-side control signal CL transiting from high level to low level, and the low-side switch driving signal VGL correspondingly transiting from high level to low level; or can refer to the low-side control signal CL transiting from low level to high level, and the low-side switch driving signal VGL correspondingly transiting from low level to high level.

According to an exemplary embodiment of the present disclosure, the control circuit 120 may be further configured to dynamically adjust the dead time tdd adaptively. In an exemplary embodiment, the control circuit 120 may further include an adaptive dead time adjustment ("ADTA") circuit 170. In an exemplary embodiment, the control circuit 120 (or the ADTA circuit 170 therein) is configured to adaptively adjust the dead time tdd according to a capacitance parameter of the high-side switch QH and a capacitance parameter of the low-side switch QL. In an exemplary embodiment, the control circuit 120 (or the ADTA circuit 170 therein) may be configured to adaptively adjust the dead time tdd according to the output feedback signal Vcomp (or according to the output voltage Vout or the output power Pout). In an exemplary embodiment, the control circuit 120 (or the ADTA circuit 170 therein) may be configured to adaptively adjust the dead time tdd according to the input voltage VIN.

Figure 2:
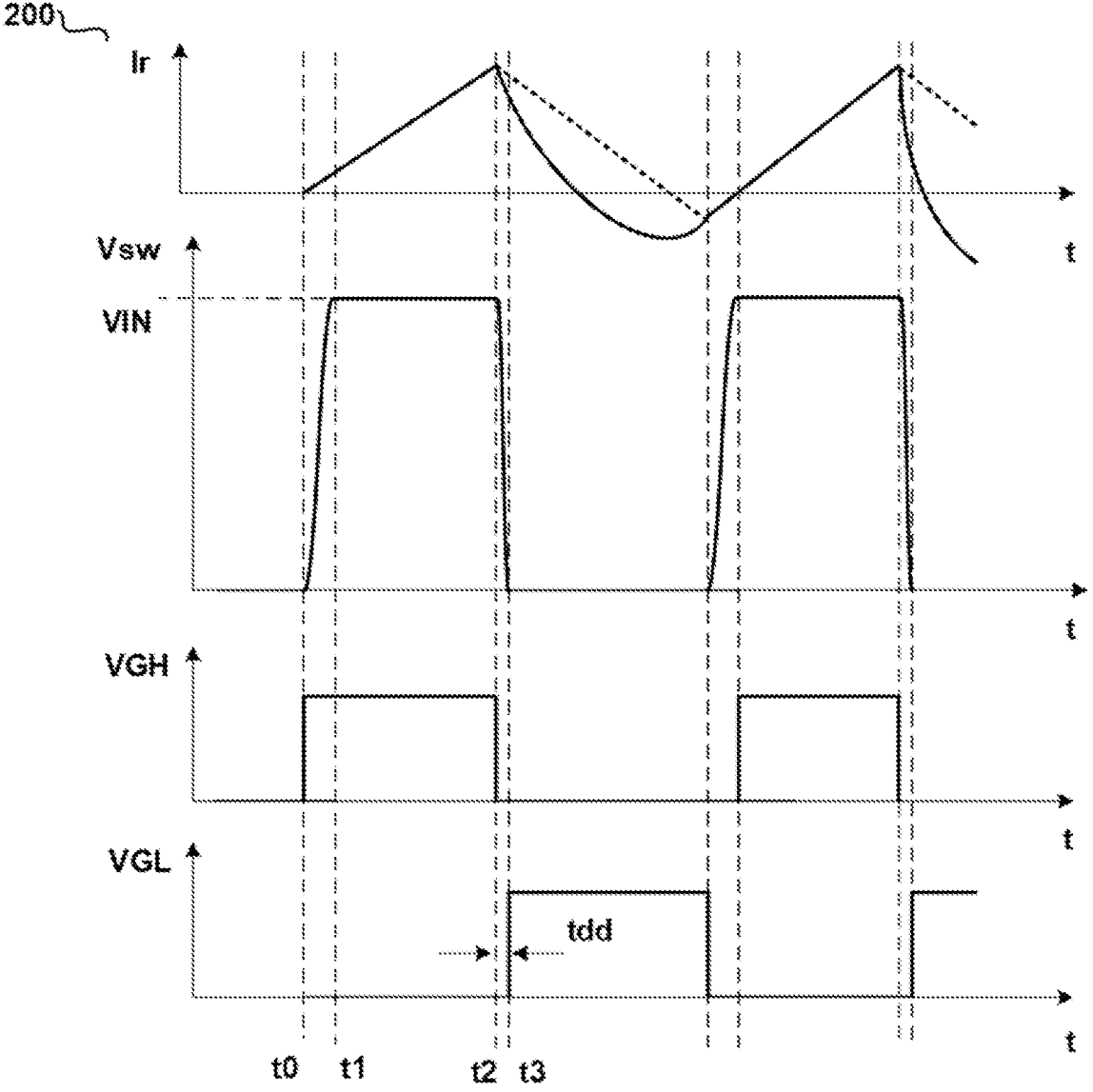
FIG. 2 schematically shows a waveform 200 of some signals in a control circuit 120, in accordance with an embodiment of the present disclosure.

FIG. 2 schematically shows a waveform 200 of some signals in the control circuit 120, in accordance with an embodiment of the present disclosure. The following is further illustrated in conjunction with FIGS. 1 and 2. For example, at time to, the control circuit 120 controls the high-side switch driving signal VGH to transit from a reset logic state (e.g., logic low) to a set logic state (e.g., logic high), and the high-side switch driving signal VGH controls the high-side switch QH switches from off to on. During the period from time to to time t1, the input voltage VIN drives the primary winding Lp (e.g., including driving its excitation inductor Lm) of the inductive energy storage device T and the resonant inductor Lr (in the example of FIG. 1, the resonant inductor Lr is illustrated as the leakage inductance of the primary winding Lp) through the path conducted by the high-side switch QH, and until time t1, the voltage Vsw at the common connection terminal SW is charged to reach the input voltage VIN. The current (hereinafter referred to as primary-side current) Ir flowing through the primary winding Lp increases linearly, and its rising slope can be expressed by VIN/(Lr+Lm). During the period from time t1 to time t2, the primary-side current Ir continues to increase, and the current sensing signal Vcs also increases. Until time t2, the current sensing signal Vcs reaches the output feedback signal Vcomp, and the control circuit 120 changes the high-side switch driving signal VGH from the set logic state (e.g., logic high) to the reset logic state (e.g., logic low) for immediately turn off the high-side switch QH. At this time, the primary-side current Ir reaches its peak value Ir_peak (hereinafter referred to as a primary-side current peak value Ir_peak). It can be seen that the voltage amplitude of the output feedback signal Vcomp determines on-time (i.e., on duration) of the high-side switch QH and the primary-side current peak value Ir_peak. At time t2, we have the following expressions (1) and (2):

$$V_{cs} = \text{Ir\_peak} * K_{cs} = V_{comp} \tag{1}$$

$$Q_{pk} = V_{IN} * C_{sw} \tag{2}$$

Kcs in the above expression (1) is the current sensing coefficient or current sensing gain, which mainly depends on the circuit structure and parameters of the current sensing circuit 103. Usually, when the design scheme of the power converter 100 or the control circuit 120 is determined according to the application scenario, or when the control circuit 120 is applied to a specific practical application (such as driving the half-bridge 110 to build the power converter 100) to meet the requirements of a specific application scenario, the current sensing coefficient Kcs can be regarded as a set value or a user programmable value, which can be a known parameter in short. In the above expression (2), Qpk represents the charge amount accumulated/stored at the common connection terminal SW when the voltage Vsw at the common connection terminal SW is charged to the input voltage VIN (hereinafter referred to as a peak charge amount Qpk stored at the common connection terminal SW).

Continuing with FIG. 2, after the high-side switch QH is turned off, according to the principle that the current of the inductive element cannot be changed suddenly, the current Ir flowing through the excitation inductor Lm of the primary winding Lp and the resonant inductor Lr (such as the leakage inductance of the primary winding Lp in FIG. 1) continues to flow in the original direction. Then, a body diode of the low-side switch QL is turned on, and the excitation inductor Lm and the resonant inductor Lr form a resonant cavity with the Cr, so that the voltage Vsw at the common connection terminal SW oscillates from the input voltage VIN. In order to reduce the switching loss of the switch and optimize the efficiency of the power converter 100, it is expected that when the voltage Vsw at the common connection terminal SW oscillates to the primary-side reference ground PGND potential (for example, as shown time t3 in FIG. 2), the low-side switch QL is immediately turned on to realize accurate zero-voltage switching. The period from time t2 to time t3 is the dead time tdd. Since the period from time t2 to time t3 (i.e., the dead time tdd) is very short compared with the resonant period of the resonant cavity formed by the excitation inductor Lm and the resonant inductor Lr and the Cr, the discharge current generated during the period from time t2 to time t3 by the voltage Vsw at the common connection terminal SW oscillating from the input voltage VIN to the primary-side reference ground PGND potential (i.e. the peak charge amount Qpk stored at the common connection terminal SW is completely released or released to zero) is regarded as the primary-side peak current peak value Ir_peak, then we have the following expression (3):

$$tdd = Q_{pk}/\text{Ir\_peak} \tag{3}$$

To substituting expression (1) and expression (2) into expression (3), we can get that:

$$tdd = V_{IN} * C_{sw} * K_{cs}/V_{comp}) \tag{4}$$

As can be seen from the above expression (4), according to an exemplary embodiment of the present disclosure, the control circuit 120 (or the ADTA circuit 170 therein) may be further configured to adaptively adjust the dead time tdd according to the capacitance parameter of the high-side switch QH and the capacitance parameter of the low-side switch QL. In an exemplary embodiment, the control circuit 120 (or the ADTA circuit 170 therein) is configured to adaptively adjust the dead time tdd to vary in a same direction as an equivalent capacitance Csw of the capacitance parameter of the high-side switch QH and the capacitance parameter of the low-side switch QL at the common connection terminal SW varies. That is, the dead time tdd increases as the equivalent capacitance Csw increases, and decreases as the equivalent capacitance Csw decreases. According to an exemplary embodiment of the present disclosure, the capacitance parameter of the high-side switch QH may include a parasitic capacitance (referred to as gate-source parasitic capacitance) Cgsh between the gate and the source of the high-side switch QH and a parasitic capacitance (referred to as source-substrate parasitic capacitance) Csbh between the source and the substrate of the high-side switch QH. The capacitance parameter of the low-side switch QL may include a parasitic capacitance (referred to as drain-gate parasitic capacitance) Cdgl between the drain and gate of the low-side switch QL and a parasitic capacitance (referred to as drain-substrate parasitic capacitance) Cdbl between the drain and substrate of the low-side switch QL. Then in this exemplary embodiment, the equivalent capacitance Csw may be expressed as Csw=Cgsh+Csbh+Cdgl+Cdbl. Therefore, it can also say that the control circuit 120 (or the ADTA circuit 170 therein) is configured to adaptively adjust the dead time tdd to vary in a same direction as the capacitance parameter of the high-side switch QH and the capacitance parameter of the low-side switch QL vary, that is, the dead time tdd increases as the capacitive parameters of the high-side switch QH and the low-side switch QL increase, and decreases as the capacitive parameters of the high-side switch QH and the low-side switch QL decrease. Existing methods, such as adjusting the dead time based on detecting the valley bottom value of the voltage VSW at the common connection terminal SW (turning on the low-side switch QL when the valley bottom value is detected after the high-side switch QH is turned off), are limited in detection accuracy and which will drift with different models of the selected high-side switch QH and the low-side switch QL, resulting in limited adjustment accuracy and limited allowed minimum value of the dead time, and also easily causing the low-side switch to miss the turn-on point for realizing zero-voltage switching. In contrast, the control circuit (or ADTA circuit therein) of each embodiment of the present application can quickly and accurately adjust the dead time tdd based on the capacitance parameter of the high-side switch QH and the capacitance parameter of the low-side switch QL, that is, the interval between the time when the high-side switch driving signal VGH transits from the set logic state (e.g., logic high) to the reset logic state (e.g., logic low) (such as time t2 in FIG. 2) and the time when the low-side switch driving signal VGL transits from the reset logic state (e.g., logic low) to the set logic state (e.g., logic high) (such as time t3 in FIG. 2) can be controlled more quickly and accurately. Since the dead time tdd is just the time elapsed from the time when the high-side switch QH is turned off (time t2) to the time when the voltage Vsw at the common connection terminal SW oscillates and drops to the primary-side reference ground PGND potential, then at the end of the dead time tdd (time t3), the low-side switch QL can be turned on immediately by making the low-side switch driving signal VGL transit to the set logic state, so as to realize accurate zero-voltage switching, reduce the switching loss and optimize the efficiency of the power converter 100.

In an exemplary embodiment, according to the specific models of high-side switch QH and low-side switch QL in practical application, the user can input the capacitance parameter of the high-side switch QH and the capacitance parameter of the low-side switch QL or their equivalent capacitance Csw at the common connection terminal SW into the logic control unit 140 through the UART terminal of the control circuit 120. For example, the two capacitance parameters or their equivalent capacitance Csw are stored in a storage unit (e.g., Memory/Register) in the logic control unit 140 for later calling, for example, to be sent to the ADTA circuit 170. In FIG. 1, the capacitance parameter of the high-side switch QH and the capacitance parameter of the low-side switch QL or their equivalent capacitance Csw at the common connection terminal SW stored in the storage unit are indicated by CapList. In another exemplary embodiment, it can also pre-store the capacitance parameter (or their equivalent capacitances Csw at the common connection terminal SW) of several pairs of recommended high-side switches QH and low-side switches QL of specific models in the storage unit (e.g., Memory/Register) in the logic control unit 140, and the user can select a pair of high-side switch QH and low-side switch QL from them according to the actual application requirements, to build a specific application circuit together with the control circuit 120. The user can use the setting command at the UART terminal to indicate the logic control unit 140 to send the capacitance parameter of the high-side switch QH and the capacitance parameter of the low-side switch QL or their equivalent capacitance Csw at the common connection terminal SW corresponding to the selected pair of specific models to the ADTA circuit 170. The present invention is not so limited. Any other implementation and implementation circuit that can input the capacitance parameter of the high-side switch QH and the capacitance parameter of the low-side switch QL or their equivalent capacitance Csw at the common connection terminal SW into the control circuit 120 or the ADTA circuit 170 therein are not beyond the protection scope of the present disclosure.

According to an exemplary embodiment of the present disclosure, similarly, signals/parameters such as the current sensing coefficient Kcs and the low-side driver propagation delay Tdl can also be input into the logic control unit 140 by the user through the UART terminal of the control circuit 120, and then, for example, stored by the storage unit in the logic control unit 140 for later calling, for example, to be sent to the ADTA circuit 170. Alternatively, several recommended parameter setting values of the signals/parameters such as the current sensing coefficient Kcs and the low-side driver propagation delay Tdl can be pre-stored in the storage unit (e.g., Memory/Register) in the logic control unit 140, and the user can select one of these recommended parameter setting values according to the actual application requirements, for example, can indicate (for example, by using the setting command of at the UART terminal) the logic control unit 140 to send the selected parameter values of the current sensing coefficient Kcs and the low-side driver propagation delay Tdl to the ADTA circuit 170.

According to an exemplary embodiment of the present disclosure, the logic control unit 140 may further include a programmable logic unit such as a multi-time programmable logic unit (MTP).

According to an exemplary embodiment of the present disclosure, the control circuit 120 (or the ADTA circuit 170 therein) may be further configured to adaptively adjust the dead time tdd according to the output feedback signal Vcomp (or, according to the output voltage Vout or the output power Pout). In an exemplary embodiment of the present disclosure, the control circuit 120 (or the ADTA circuit 170 therein) is configured to adaptively adjust the dead time tdd to vary in an opposite direction as the output feedback signal Vcomp varies, that is, to adaptively adjust the dead time tdd to decrease as the output feedback signal Vcomp increases, and to increase as the output feedback signal Vcomp decreases. In an exemplary embodiment, the output feedback signal Vcomp varies in an opposite direction as the output voltage Vout varies, that is, the output feedback signal Vcomp decreases as the output voltage Vout increases, and increases as the output voltage Vout decreases. Therefore, it can be regarded that the control circuit 120 (or the ADTA circuit 170 therein) is configured to adaptively adjust the dead time tdd to vary in a same direction as the output voltage Vout varies, that is, the dead time tdd increases as the output voltage Vout increases, and decreases as the output voltage Vout decreases. In an exemplary embodiment, the output feedback signal Vcomp vary in a same direction as the output power Pout varies, that is, the output feedback signal Vcomp increases as the output power Pout increases and decreases as the output power Pout decreases. Therefore, it can be regarded that the control circuit 120 (or the ADTA circuit 170 therein) is configured to adaptively adjust the dead time tdd to vary in an opposite direction as the output power Pout varies, that is, the dead time tdd decreases as the output power Pout increases and increases as the output power Pout decreases. As mentioned above, usually for specific application scenarios, when application parameters (such as the output voltage Vout, and the output power Pout) has been determined, the output feedback signal Vcomp may be regarded as a determined parameter. Under the condition that the output voltage Vout or the output power Pout required by the load of the power converter 100 is constant, the output feedback signal Vcomp is almost constant. For different specific application scenarios, the control circuit according to the embodiment of the present disclosure can flexibly and adaptively adjust the dead time tdd according to the changes of the output voltage or output power of the different specific application scenarios.

According to an exemplary embodiment of the present disclosure, the control circuit 120 (or the ADTA circuit 170 therein) may be further configured to adaptively adjust the dead time tdd according to the input voltage VIN. In an exemplary embodiment, the control circuit 120 (or the ADTA circuit 170 therein) is configured to adaptively adjust the dead time tdd to vary in a same direction as the input voltage VIN varies, that is, the dead time tdd increases as the input voltage VIN increases and decreases as the input voltage VIN decreases. Generally, for specific application scenarios, the input voltage VIN of the power converter 100 is a determined parameter, which is almost constant. For different specific application scenarios, the control circuit according to the embodiment of the present disclosure can flexibly and adaptively adjust the dead time tdd according to different input voltages of different specific application scenarios.

According to an exemplary embodiment of the present disclosure, the control circuit 120 (or the ADTA circuit 170 therein) may be further configured to multiply the input voltage VIN, the equivalent capacitance Csw at the common connection terminal SW and the current sensing coefficient Kcs to provide a resulting product, and then perform division operation on the resulting product and the output feedback signal Vcomp to get the dead time tdd. As such, the dead time tdd can be can precisely adjusted based on the equivalent capacitance Csw at the common connection terminal SW, that is, the interval between the time when the high-side switch driving signal VGH transits from the set logic state (e.g., logic high) to the reset logic state (e.g., logic low) (such as time t2 in FIG. 2) and the time when the low-side switch driving signal VGL transits from the reset logic state (e.g., logic low) to the set logic state (e.g., logic high) (such as time t3 in FIG. 2) can be precisely controlled. The dead time tdd is just the time period from the time when the high-side switch QH is turned off (i.e., at time t2) to the time when the voltage Vsw at the common connection terminal SW oscillates and drops to the primary-side reference ground PGND potential (i.e., at time t3), so when the dead time tdd ends (i.e., at time t3), the low-side switch driving signal VGL transiting to the set logic state can immediately turn on the low-side switch QL, thereby realizing accurate zero-voltage switching, reducing the switching loss and optimizing the efficiency of the power converter 100.

According to an exemplary embodiment of the present disclosure, the delay time signal Td may be indicated by the dead time tdd signal. In this example, the logic control unit 140 may be configured to provide the low-side control signal CL to the low-side driver (LS Driver) 190 according to the high-side switch driving signal VGH and the dead time tdd. For example, the logic control unit 140 may be configured to, in response to a transition edge/transition moment of each transition for the high-side switch driving signal VGH from the set logic state (e.g., logic high) to the reset logic state (e.g., logic low), trigger the low-side control signal CL to transit from the reset logic state (e.g., logic low) to the set logic state (e.g., logic high) after a delay time indicated by the delay time signal Td (it is also the duration of the dead time tdd in this example). This a mechanism for adaptive closed-loop adjustment of the dead time tdd. The technical scheme of adaptive closed-loop adjustment of the dead time tdd according to the embodiments of the present disclosure can adjust the dead time tdd faster and more accurately, so that the dead time tdd can be set to a smaller value (for example, less than 150 ns), and the control circuit 120 can support a higher (for example, higher than 500 kHz) operating frequency (or a switching frequency, i.e., the switching frequency at which the high-side switch QH and the low-side switch QL are switched on and off in FIG. 1), realize more accurate zero-voltage switching control, reduce the switching loss and improve the efficiency of the power converter 100, when it is applied in the power converter 100.

According to an exemplary embodiment of the present disclosure, referring to FIG. 1, the ADTA circuit 170 may include an analog-to-digital converter ADC, for example, for receiving the input voltage VIN (or an input voltage sensing signal indicative of the input voltage VIN) through an input terminal of the control circuit 120 (which is also labeled as IN for simplicity), and performing an analog-to-digital conversion on the input voltage VIN (or the input voltage sensing signal) to provide a digital signal indicative of the input voltage VIN. In an embodiment, the analog-to-digital converter ADC may be integrated inside the control circuit 120. In other embodiments, the analog-to-digital converter ADC may not be integrated in the control circuit 120, but may be provided outside the control circuit 120. In an embodiment, the analog-to-digital converter ADC may also be integrated into the logic control unit 140, thus the ADTA circuit 170 may not include the analog-to-digital converter ADC in such an embodiment. In addition to performing the analog-to-digital conversion on the input voltage VIN, the analog-to-digital converter ADC may be further configured to perform the analog-to-digital conversion on the output feedback signal Vcomp to provide a digital signal that is indicative of the output feedback signal Vcomp. According to an exemplary embodiment of the present disclosure, the ADTA circuit 170 may further include a multiplier Multiplier, for receiving the digital signal indicative of the input voltage VIN, a digital signal indicative of the equivalent capacitance Csw, and a digital signal indicative of the current sensing coefficient Kcs, and multiplying these digital signals to provide a digital signal indicative of the peak charge amount Qpk stored at the common connection terminal SW. According to an exemplary embodiment of the present disclosure, the ADTA circuit 170 may further include a divider Divider, configured to receive the digital signal indicative of the peak charge amount Qpk stored at the common connection terminal SW and the digital signal indicative of the output feedback signal Vcomp, and perform division operation on these two digital signals to provide a digital signal indicative of the dead time tdd.

Figure 3:
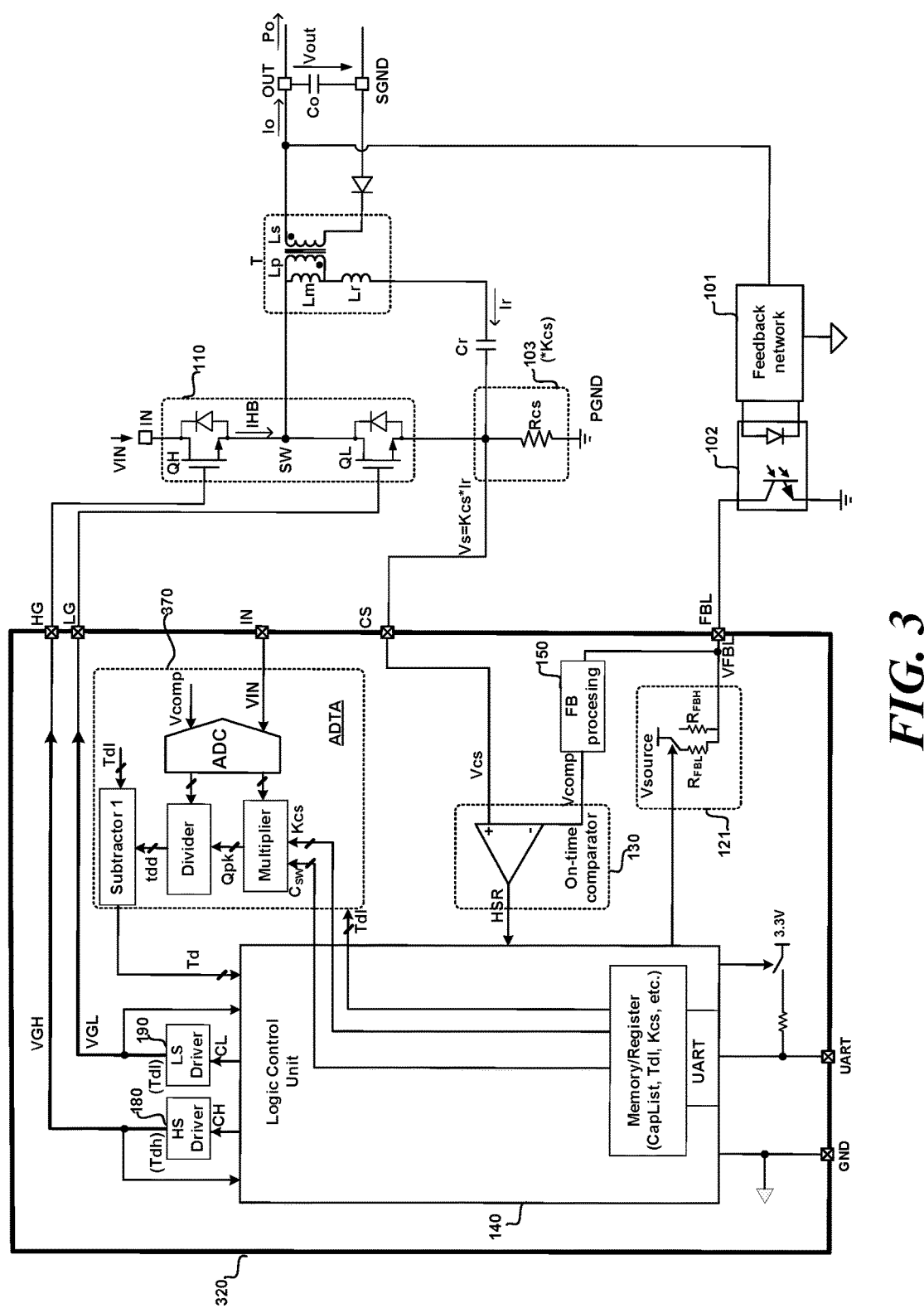
FIG. 3 schematically shows a circuit diagram of a power converter 300, in accordance with a variant embodiment of the present disclosure.

FIG. 3 schematically illustrates a power converter 300, in accordance with an exemplary embodiment of the present disclosure. As described above, in practical circuits and applications, the low-side driver 190 has the low-side driver propagation delay Tdl. The power converter 300 is different from the power converter 100 in that, on the basis of the control circuit 120 (or the ADTA circuit 170 therein), the control circuit 320 (or the ADTA circuit 370 therein) of the power converter 300 may be further operable for eliminating or correcting the influence of the low-side driver propagation delay Tdl on the dead time tdd. For example, the ADTA circuit 370 in the control circuit 320 may be further configured to provide the delay time signal Td to the logic control unit 140 based on the dead time tdd and the low-side driver propagation delay Tdl. In an example, in addition to the ADTA circuit 170, the ADTA circuit 370 may further include a first subtractor Subtractor1 (or a delay subtractor), and perform subtraction operation on the dead time tdd (or the digital signal indicative of the dead time tdd) and the low-side driver propagation delay Tdl (or a digital signal indicative of the low-side driver propagation delay Tdl) to provide the delay time signal Td (in this example, the delay time signal Td is a digital signal) to the logic control unit 140 for subsequent operations in the forms of logical/digital signals. The remaining circuit components, together with their connection relationships and related working principles are the same as those in the power converter 100, and the description of which are omitted here for the sake of simplicity. In an exemplary embodiment, the delay time signal Td may be expressed by the following expression (5):

$$Td = tdd - Tdl = V\,IN * Csw * Kcs/V\,comp - Tdl \qquad (5)$$

As can be seen from the above expression (5), in this exemplary embodiment, the delay time signal Td is firstly determined by subtracting the low-side driver propagation delay Tdl from the dead time tdd, then the logic control unit 140 provides the low-side control signal CL according to the high-side switch driving signal VGH and the delay time signal Td, and then the low-side driver 190 outputs the low-side switch driving signal VGL (which is equivalent to superimposing the previously subtracted low-side driver propagation delay Tdl back), so that the influence of the low-side driver propagation delay Tdl on the dead time tdd can be eliminated or corrected. In this way, the dead time tdd can be more accurate through the adaptive closed-loop adjustment, and the dead time tdd can be set without considering the time occupied by the low-side driver propagation delay Tdl, thus allowing the dead time tdd to be set to a smaller value (for example, less than 70 ns). In an exemplary embodiment, the dead time tdd may be set to less than or equal to 50 ns.

Figure 4:
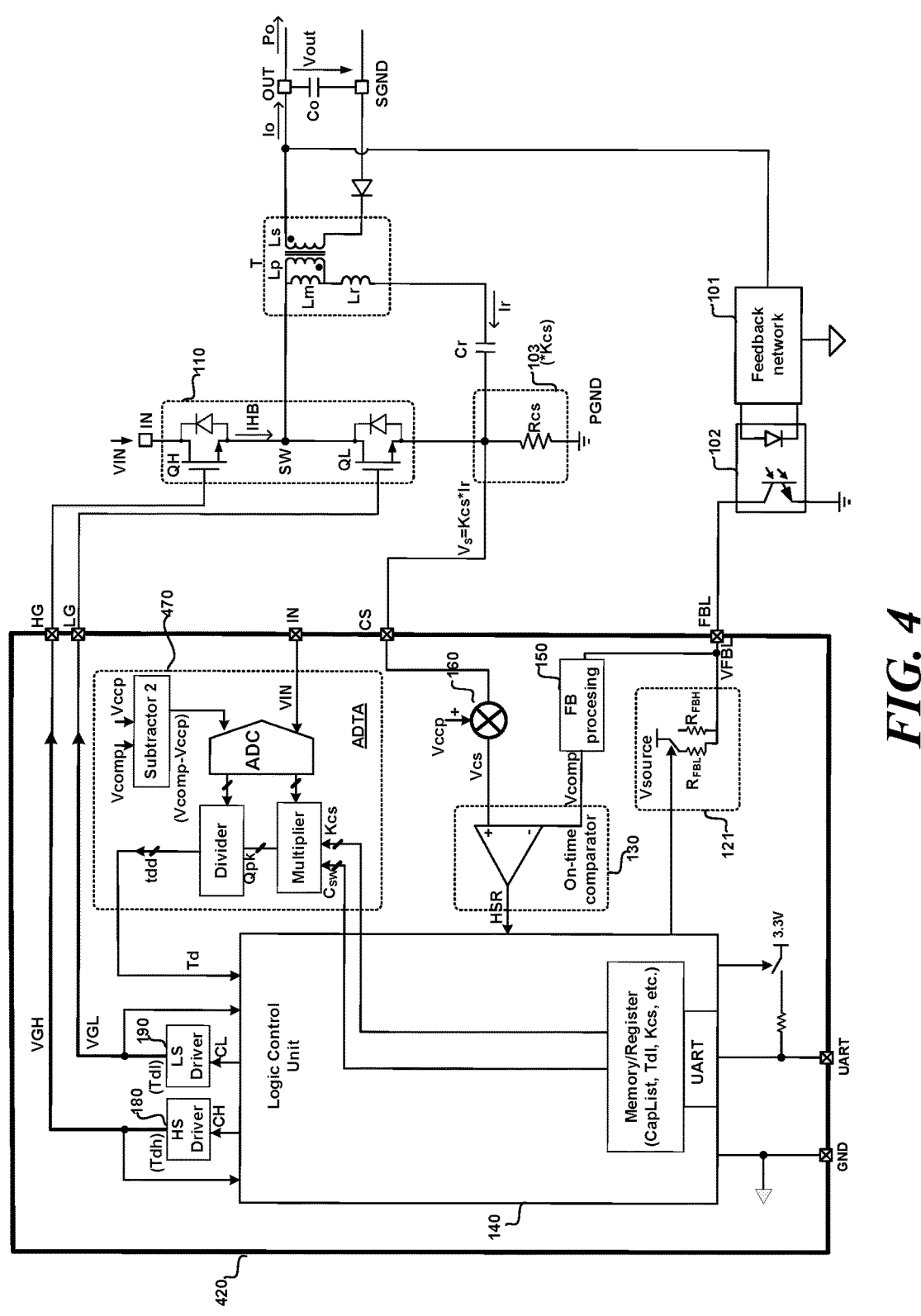
FIG. 4 schematically shows a circuit diagram of a power converter 400, in accordance with another variant embodiment of the present disclosure.
Figure 5:
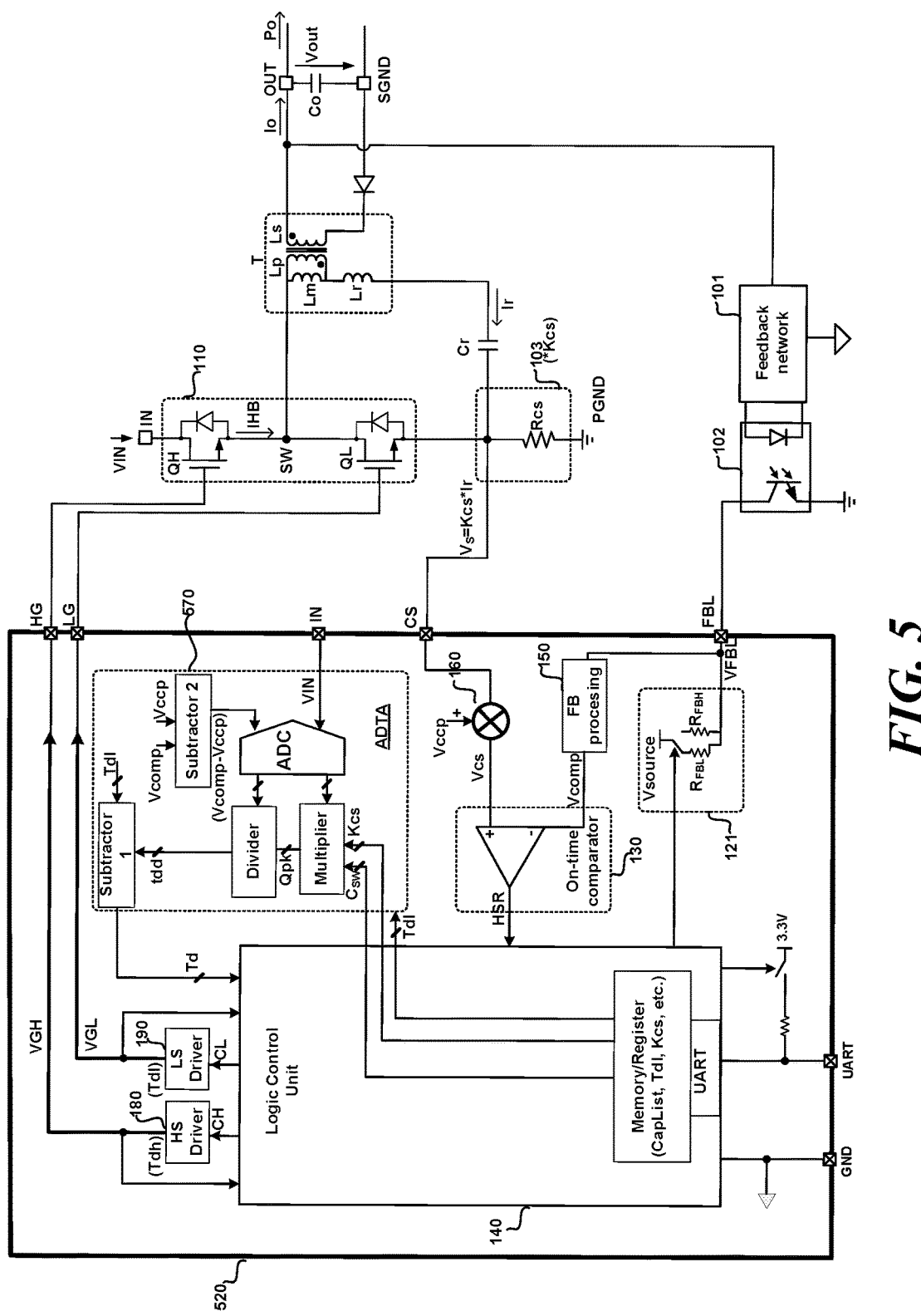
FIG. 5 schematically shows a circuit diagram of a power converter 500, in accordance with yet another variant embodiment of the present disclosure.

According to a variant exemplary embodiment of the present disclosure, the uncompensated current sensing signal Vs may be compensated to provide the current sensing signal Vcs, referring to the power converters 400 and 500 shown in FIGS. 4 and 5. The power converter 400 illustrated in FIG. 4 can be regarded as a variant of the power converter 100 in the embodiment of FIG. 1. The power converter 400 differs from the power converter 100 in that its control circuit 420 may further include a compensation circuit 160 compared with the control circuit 120. The compensation circuit 160 is configured to receive the uncompensated current sensing signal Vs and to superimpose it with a compensation signal Vccp to generate the current sensing signal Vcs. That is, in this example, Vcs=Vs+Vccp. The compensation signal Vccp is not limited to contain only one compensation signal, but also can be the superposition of two or more compensation signals. In this example, still combined with the waveform of FIG. 2, at time t2, there is the following expression (6):

$$Vcs = Ir\_peak * Kcs + V\,ccp = V\,comp \qquad (6)$$

Therefore, for the example of FIG. 4, by substituting equation (2) and equation (6) into equation (3), we can see that the dead time tdd is expected to satisfy the following equation (7):

$$tdd = VIN * Csw * Kcs/(V\,comp - V\,ccp) \qquad (7)$$

It can be seen from the above expression (7) that according to the embodiment illustrated in FIG. 4 of the present disclosure, the control circuit 420 (or the ADTA circuit 470 therein) may be configured to multiply the input voltage VIN, the equivalent capacitance Csw at the common connection terminal SW and the current sensing coefficient Kcs to provide a resulting product, and then perform division operation on the resulting product and a difference signal (Vcomp-Vccp) of the output feedback signal Vcomp and the compensation signal Vccp to get the dead time tdd. Therefore, the power converter 400 illustrated in FIG. 4 is different from the power converter 100 illustrated in FIG. 1 in that, on the basis of the ADTA circuit 170 in the control circuit 120, the ADTA circuit 470 in the control circuit 420 may further include a second subtractor Subtractor2 (or a compensation subtractor), for performing subtraction operation on the output feedback signal Vcomp and the compensation signal Vccp to provide the difference signal (Vcomp-Vccp) of the output feedback signal Vcomp and the compensation signal Vccp to the analog-to-digital converter ADC. Thus, in the example of FIG. 4, instead of providing the digital signal indicative of the output feedback signal Vcomp in the example of FIG. 1, the analog-to-digital converter ADC provides a digital signal indicative of the difference signal (Vcomp-Vccp) to the divider Divider. The remaining circuit components, together with their connection relationships and related working principles in the power converter 400 are the same as those in the power converter 100, and the description of which are omitted here for the sake of simplicity. Terms such as first, second, etc. in the present disclosure are used to distinguish the different elements/components, and are not used to indicate the order, unless otherwise specified.

The power converter 500 in FIG. 5 is a variant of the power converter 300 in FIG. 3. On one hand, the power converter 500 is different from the power converter 300 in that its control circuit 520 may further include the compensation circuit 160. The above description of the compensation circuit 160 with reference to FIG. 4 is applicable to the embodiment of FIG. 5, so the expression of dead time tdd in the above expression (7) is also applicable to the embodiment of FIG. 5. As can be seen from the above expression (7), according to the embodiment illustrated in FIG. 5 of the present disclosure, the control circuit 520 (or the ADTA circuit 570 therein) may be configured to multiply the input voltage VIN, the equivalent capacitance Csw at the common connection terminal SW and the current sensing coefficient Kcs to provide a resulting product, and then perform division operation on the resulting product and the difference of the output feedback signal Vcomp and the compensation signal Vccp to generate the dead time tdd. Therefore, on the other hand, the power converter 500 illustrated in FIG. 5 is different from the power converter 300 illustrated in FIG. 3 in that, on the basis of the ADTA circuit 370 in the control circuit 320, the ADTA circuit 570 in the control circuit 520 further includes a second subtracter Subtractor 2 (or a compensation subtractor), for performing subtraction operation on the output feedback signal Vcomp and the compensation signal Vccp to provide a difference signal (Vcomp–Vccp) of the output feedback signal Vcomp and the compensation signal Vccp to the analog-to-digital converter ADC. Thus, in the example of FIG. 5, instead of providing the digital signal indicative of the output feedback signal Vcomp in the example of FIG. 3, the analog-to-digital converter ADC provides the digital signal indicative of the difference signal (Vcomp–Vccp) to the divider Divider. The remaining circuit components, together with their connection relationships and related working principles in the converter 500 are the same as those in the power converter 300, and the description of which are omitted here for the sake of simplicity. Then in the example of FIG. 5, the delay time signal Td satisfies the following expression (8):

$$Td = tdd - Tdl = V \text{ IN} * Csw * Kcs/(V \text{ comp} - V \text{ ccp}) - Tdl \quad (8)$$

Although some embodiments of the present disclosure have been described in detail above, these embodiments are used for illustration only and are not used to limit the scope of the invention. Other feasible alternative embodiments can be known to those skilled in the art by reading the present disclosure.

What is claimed is:

1. A control circuit for a power converter, wherein:

the control circuit is configured to provide a first switch driving signal and a second switch driving signal based on a current sensing signal and an output feedback signal, and to change the first switch driving signal from a first driving set logic state to a first driving reset logic state when the current sensing signal reaches the output feedback signal, wherein the current sensing signal is indicative of a switch current flowing through a first power switch or a second power switch in the power converter or an inductive current flowing through an inductive energy storage device in the power converter, and the output feedback signal is indicative of an output voltage or an output power of the power converter; and wherein the control circuit is further configured to change the second switch driving signal from a second driving reset logic state to a second driving set logic state after a dead time expires since a moment when the first switch driving signal is changed from the first driving set logic state to the first driving reset logic state; and wherein the control circuit is further configured adaptively adjust the dead time to vary in a same direction as a capacitance parameter of the first power switch and a capacitance parameter of the second power switch vary.

2. The control circuit of claim 1, wherein the control circuit is further configured to adaptively adjust the dead time to vary in an opposite direction as the output feedback signal varies.

3. The control circuit of claim 1, wherein the control circuit is further configured to adaptively adjust the dead time to vary in a same direction as an input voltage of the power converter varies.

4. The control circuit of claim 1, wherein the current sensing signal comprises an uncompensated current sensing signal, and wherein the control circuit is further configured to multiply an input voltage of the power converter, an equivalent capacitance of the capacitance parameter of the first power switch and the capacitance parameter of the second power switch at a common connection terminal of the first power switch and the second power switch, and a current sensing coefficient to provide a resulting product, and to perform division operation on the resulting product and the output feedback signal to generate the dead time, and wherein the current sensing coefficient represents a proportional coefficient of the uncompensated current sensing signal to the switch current or a proportional coefficient of the uncompensated current sensing signal to the inductive current.

5. The control circuit of claim 1, further comprising an adaptive dead time adjustment ("ADTA") circuit, wherein the ADTA circuit comprises:

a multiplier, configured to receive a first digital signal indicative of an input voltage of the power converter, a second digital signal indicative of an equivalent capacitance of the capacitance parameter of the first power switch and the capacitance parameter of the second power switch at a common connection terminal of the first power switch and the second power switch and a third digital signal indicative of a current sensing coefficient of the uncompensated current sensing signal to the switch current or to the inductive current, and to multiply the first, second and third digital signals to provide a fourth digital signal indicative of a peak charge amount stored at the common connection terminal; and a divider, configured to receive the fourth digital signal and a fifth digital signal indicative of the output feedback signal, and to perform division operation on the fourth digital signal and the fifth digital signal to provide a sixth digital signal indicative of the dead time.

6. The control circuit of claim 5, wherein the ADTA circuit further comprises:

an analog-to-digital converter, configured to receive the input voltage and perform analog-to-digital conversion on the input voltage to provide the first digital signal.

7. The control circuit of claim 6, wherein the analog-to-digital converter is further configured to receive the output feedback signal and to perform analog-to-digital conversion on the output feedback signal to provide the fifth digital signal.

8. The control circuit of claim 1, further comprising:

a compensation circuit, configured to receive an uncompensated current sensing signal and to superimpose the uncompensated current sensing signal with a compensation signal to generate the current sensing signal.

9. The control circuit of claim 8, wherein the control circuit is further configured to multiply an input voltage of the power converter, an equivalent capacitance of the capacitance parameter of the first power switch and the capacitance parameter of the second power switch at a common connection terminal of the first power switch and the second power switch, and a current sensing coefficient of the uncompensated current sensing signal to the switch current or to the inductive current to provide a resulting product, and to perform division operation on the resulting product and a difference signal indicative of a difference between the output feedback signal and the compensation signal to generate the dead time.

10. The control circuit of claim 8, further comprising an adaptive dead time adjustment ("ADTA") circuit, wherein the ADTA circuit comprises:

a multiplier, configured to receive a first digital signal indicative of the input voltage, a second digital signal indicative of the equivalent capacitance and a third digital signal indicative of a current sensing coefficient of the uncompensated current sensing signal to the switch current or to the inductive current, and to multiply the first, second and third digital signals to provide a fourth digital signal indicative of a peak charge amount stored at the common connection terminal;

a compensation subtractor, configured to perform subtraction operation on the output feedback signal and the compensation signal to provide the difference signal; and a divider, configured to receive the fourth digital signal and a seventh digital signal indicative of the difference signal, and to perform division operation on the fourth and seventh digital signals to provide a six digital signal indicative of the dead time.

11. The control circuit of claim 10, wherein the ADTA circuit further comprises:

an analog-to-digital converter, configured to receive the input voltage and to perform analog-to-digital conversion on the input voltage to provide the first digital signal.

12. The control circuit of claim 11, wherein the analog-to-digital converter is further configured to receive the difference signal and to perform analog-to-digital conversion on the difference signal to provide the seventh digital signal.

13. The control circuit of claim 1, further comprising:

a logic control unit, configured to receive the first switch driving signal and a delay time signal carrying an information about the dead time and to provide a low-side control signal based at least partially on the first switch driving signal and the delay time signal; and a low-side driver, configured to generate the second switch driving signal based on the low-side control signal.

14. The control circuit of claim 13, further comprising an adaptive dead time adjustment ("ADTA") circuit, wherein the ADTA circuit comprises:

a delay subtractor, configured to perform subtraction operation on a digital signal indicative of the dead time and a digital signal indicative of a propagation delay of the low-side driver to generate and provide the delay time signal to the logic control unit.

15. The control circuit of claim 13, wherein:

the logic control unit is further configured to, in response to a transition edge of each transition for the first switch driving signal from the first driving set logic state to the first driving reset logic state, trigger the low-side control signal to correspondingly transit from a low-side control reset logic state to a low-side control set logic state after a delay time indicated by the delay time signal.

16. The control circuit of claim 13, wherein the logic control unit further comprises:

a storage unit, configured to store the capacitance parameter of the first power switch and the capacitance parameter of the second power switch, or an equivalent capacitance of the capacitance parameter of the first power switch and the capacitance parameter of the second power switch at a common connection terminal of the first power switch and the second power switch.

17. The control circuit of claim 16, wherein the storage unit is further configured to store a current sensing coefficient and a propagation delay of the low-side driver, wherein the current sensing coefficient represents a proportional coefficient of an uncompensated current sensing signal to the switch current or a proportional coefficient of the uncompensated current sensing signal to the inductive current.

18. A power converter, comprising:

a first power switch and a second power switch having a common connection; and a control circuit, configured to provide a first switch driving signal and a second switch driving signal based on a current sensing signal and an output feedback signal, wherein the current sensing signal is indicative of a switch current flowing through the first power switch or the second power switch or an inductive current flowing through an inductive energy storage device in the power converter, and the output feedback signal is indicative of an output voltage or an output power of the power converter; and wherein the control circuit is further configured to change the first switch driving signal from a first driving set logic state to a first driving reset logic state when the current sensing signal reaches the output feedback signal, and to change the second switch driving signal from a second driving reset logic state to a second driving set logic state after a dead time expires since a moment when the first switch driving signal is changed from the first driving set logic state to the first driving reset logic state; and wherein the control circuit is further configured to adaptively adjust the dead time to vary in a same direction as a capacitance parameter of the first power switch and a capacitance parameter of the second power switch vary.

19. The power converter of claim 18, wherein the control circuit further comprises:

an adaptive dead time adjustment ("ADTA") circuit, configured to provide a delay time signal carrying an information about the dead time; a logic control unit, configured to receive the first switch driving signal and the delay time signal, and to provide a low-side control signal based at least partially on the first switch driving signal and the delay time signal; and a low-side driver, configured to generate the second switch driving signal based on the low-side control signal.

20. The control circuit of claim 19, wherein the ADTA circuit further comprises:

a first subtractor, configured to perform subtraction operation on a digital signal indicative of the dead time and a digital signal indicative of a propagation delay of the low-side driver, to generate and provide the delay time signal to the logic control unit.

* * * * *